J. C. MARTIN, Jr.
PLUG COCK.
APPLICATION FILED APR. 10, 1919.
1,365,116.
Patented Jan. 11, 1921.
2 SHEETS—SHEET 1.
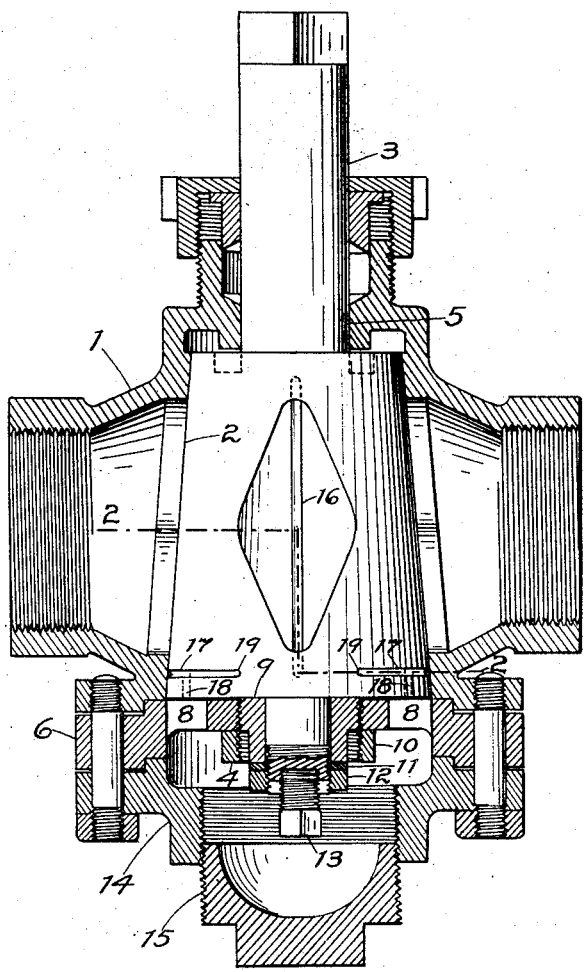
FIG. 1
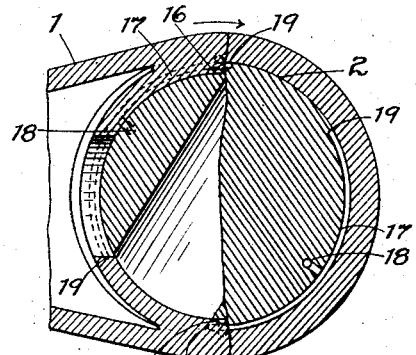
FIG. 3
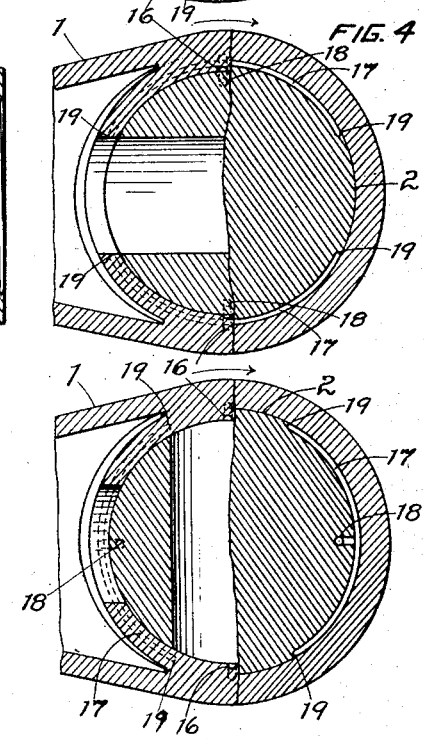
FIG. 4
FIG. 2
INVENTOR.

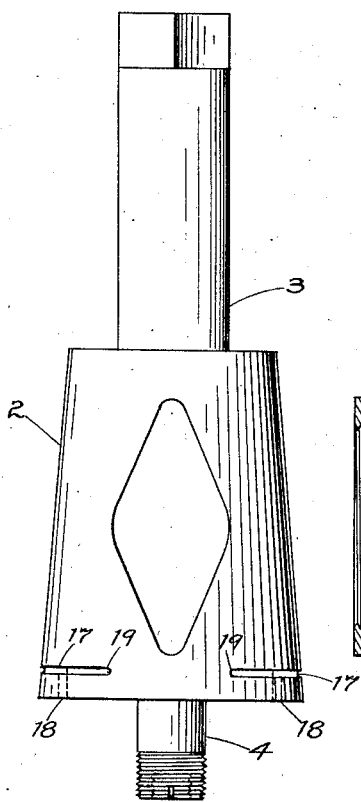
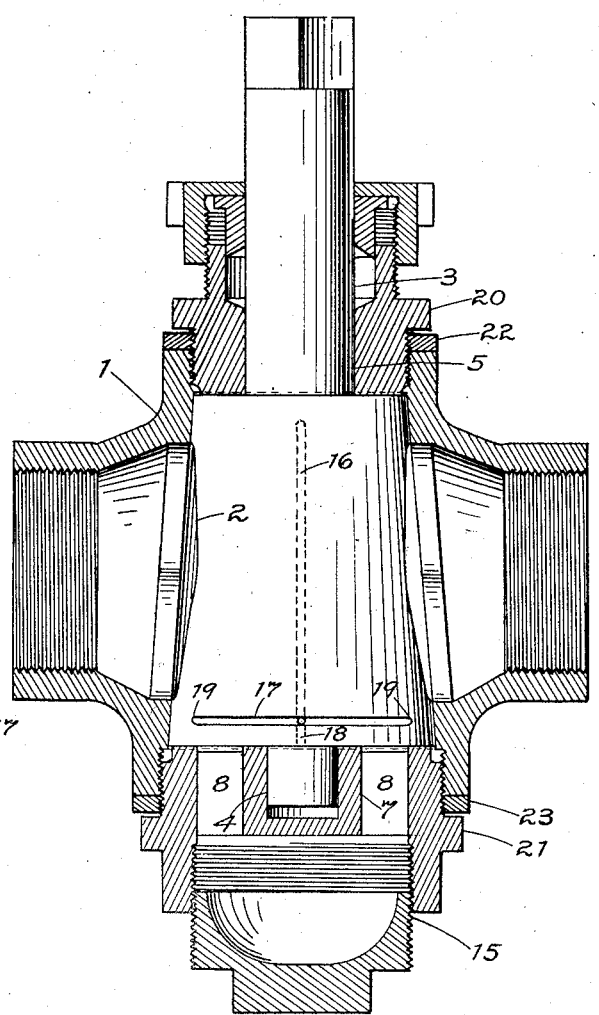
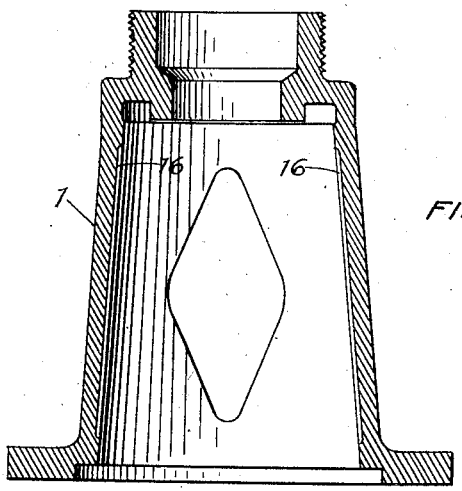

UNITED STATES PATENT OFFICE.

JESSE C. MARTIN, JR., OF SAN FRANCISCO, CALIFORNIA.

PLUG-COCK.

1,365,116.   Specification of Letters Patent.   Patented Jan. 11, 1921.

Application filed April 10, 1919. Serial No. 289,014.

*To all whom it may concern:*

Be it known that I, JESSE C. MARTIN, Jr., a citizen of the United States, and a resident of San Francisco, county of San Francisco, and State of California, have invented certain new and useful Improvements in Plug-Cocks, of which the following is a specification.

The hereinafter described invention relates to that class of cocks used in pipe lines for stopping or controlling the flow of fluids.

One of the objects of the invention is to preserve the integrity of the frictionally engaging surfaces of the plug and plug seat of the cock by the introduction of lubricant thereto.

Another object of the invention is to prevent leakage and failure and instead thereof to insure uniformly good and continuous service in a plug cock by eliminating the cutting or abrasion common to this type of fitting upon movement of the plug in the plug seat.

A further object of the invention is to prevent corroding or sticking of the plug in the plug seat as when the cock is only periodically opened and closed, such as in boiler blow-off service, by spreading a film of lubricant over the engaging surfaces of plug and plug seat.

An important object of the invention is to provide a construction for holding the plug and plug seat of the cock in close working relation to each other without resorting to the fluid pressure passing through the fitting or springs to force the plug into the plug seat for making the tight joint there between, and to make such construction so that the engaging surfaces of the plug and plug seat can be adjusted to compensate for wear as well as for expansion and contraction caused by the fluid flow in the pipe line where applied.

Another object of the invention is to provide stems or journals on either end of the plug riding in adjustable bearings in the casing for the purpose of holding and guiding the plug in the plug seat, thereby eliminating the thrust and wear caused by the fluid pressure forcing the plug against the plug seat, particularly noticeable in plug cocks of ordinary construction when the plug is turned in the plug seat to open the fluid flow there-through.

Another object of the invention is to prevent forcing of the plug into the plug seat as when grease or hard oil is forced into the lubricating ducts between the plug and plug seat through the provision of means for holding the frictionally engaging surfaces of the plug and plug seat in fluid tight working relation so that they will not be effected by the lubricant pressure exerted.

Another object of the invention is to provide ports and grooves in the plug and plug seat of the cock communicating with a lubricant supply in the cock casing and to so arrange the lubricant passages that there will be a definite point of inlet and cut-off of the lubricant upon turning the plug more than a quarter of a turn in the plug seat which will minimize the consumption of lubricant and spread it fully over the faces of the plug and plug seat.

In the accompanying drawings Figure 1 is a sectional elevation with plug shown in full seated in the plug seat all parts being fully assembled in accordance with my invention.

Fig. 2 is a section taken on line 2—2— Fig. 1 showing location of lubricant feeding grooves in plug and plug seat when cock is fully closed to fluid passage. Fig. 3 is also a section on line 2—2— Fig. 1 showing position of lubricating grooves of plug and plug seat when fluid flow through the cock is just starting, the plug being moved clockwise in the plug seat from full closed position shown in Fig. 2. Fig. 4 is likewise a section on line 2—2 Fig. 1 showing the location of the communicating lubricant grooves of plug and plug seat when the cock is full open to fluid flow, the plug being moved in the plug seat clockwise from position shown in Fig. 3. Fig. 5 is a full view of the plug removed from the plug seat showing circumferential lubricant grooves and ports therein. Fig. 6 is a sectional view of the cock casing showing plug seat with vertical lubricant grooves therein. Fig. 7 is a modification of my invention.

Numeral 1 represents a cock casing or body fitted for pipe connections and provided with a conical seat therein. 2 is a conical plug with stems 3 and 4 on either end thereof fitting the conical seat of casing, 1, the casing being bored at one end to receive the stem, 3, in a guide or bearing at 5 and fitted at its opposite end with a flange, 6. Flange, 6, is constructed with a central boss, 7, bridged to its body to form ports, 8. Boss, 7, is threaded to receive bushing, 9. Bushing, 9, fits and forms a bearing for plug stem, 4, being adjustably confined against the end of plug, 2, by locknut, 10. Stem, 4, is threaded outside and extends through bushing, 9, receiving washer, 11, and locknut, 12. Locknut, 12, holding stem, 4, adjustably confined against the end of bushing, 9. The screw plug, 13, tapped into the end of stem, 4, acts as a keeper for locknut, 12. Fitted to flange, 6, is holder, 14, provided with screw plug, 15.

Conical seat of casing, 1, is provided with diametrically opposite vertical grooves, 16, and plug, 2, has circumferential grooves, 17, cut therein communicating with ports, 18, therein.

In assembling the cock the plug, 2, is inserted in plug seat of casing, 1, the stem, 3, being guided through the bearing, 5. The flange, 6, is tightly secured to casing, 1, and the bearing bushing, 9, is screwed into boss, 7, being set against the end of plug, 2, so as to hold the plug and plug seat in movably fluid tight engagement in which position bearing bushing is locked by nut, 10. Plug stem, 4, is now adjusted within bushing, 9, against the end thereof so as to permit of movement of plug in plug seat in which position stem, 4, is locked by nut, 12. Holder, 14, is then attached to the flange, 6, and filled with lubricant, preferably grease or hard oil, through threaded opening provided for plug, 15. The lubricant is now compressed by plug, 15, through the flange ports, 8, into the plug ports, 18, where it is carried to the circumferential grooves, 17, in the plug and thence to the vertical grooves, 16, in the plug seat in the manner more fully described hereinafter, it being noted however that in assembling and forcing lubricant through the cock ready for service that no special care is required in locating the plug at any given position in the plug seat to prevent loss of lubricant into the fluid openings of the plug and plug seat, this being unnecessary owing to the relative location of the communicating lubricant grooves in the plug and plug seat.

In Figs. 2, 3 and 4 I have shown sections on line 2—2 Fig. 1 for the purpose of clearly disclosing the relative location of the lubricating grooves in the plug and plug seat and their communication through different movements of the plug in the plug seat from full closed to full open position to the fluid flow therethrough.

In Fig. 2 the circumferential grooves, 17, of plug, 2, are fully out of register with the vertical grooves, 16, in plug seat of casing, 1, the plug being fully closed against the plug seat and lubricant feed fully closed. By moving the plug clockwise in the plug seat to the position shown in Fig. 3 the diametrically opposite ends, 19, of the circumferential grooves, 17, in the plug are gradually brought closer to the vertical grooves, 16, in the plug seat until they register with vertical grooves, 16, simultaneously with the opening of the fluid flow through the plug seat and plug, and lubricant feed is started in vertical grooves, 16, to the frictionally engaging surfaces of the plug and plug seat and continues until the plug and plug seat are fully open to the fluid flow thereto as shown in Fig. 4, the lubricant being wiped or carried around by the continued movement of the plug in the plug seat until the plug closes against the plug seat to the passage of fluid therethrough when the ends, 19, of the circumferential plug grooves, 17, simultaneously go out of register with vertical plug seat grooves, 16, and the feed of lubricant through vertical grooves, 16, is stopped.

In this manner the lubricant feed to the frictionally engaging surfaces of the plug and the plug seat is efficiently and economically effected.

In the construction herewith shown the plug is not restricted in its movement in the plug seat, the diametrically opposite vertical grooves in the plug seat registering with the circumferential grooves in the plug in such manner that simultaneous feeding and stopping of the lubricant is effected when the plug is opened or closed respectively for the flow of fluid therethrough, however, in a construction of my invention wherein the plug is restricted in its movement in the plug seat to 90 degrees from full closed to full open position, it is obvious that the diametrically opposite vertical grooves of the plug seat can be located at any suitable point on the periphery of the plug seat outside of the fluid passages therethrough without regard to registering with the circumferential grooves of the plug as simultaneous feeding and stopping of the lubricant with the opening and closing of the fluid flow is not required, the vertical grooves of the plug seat always being covered by the bearing surface of the plug.

In Fig. 7 I have shown a slightly modified form of my invention in which the stems, 3 and 4, of plug, 2, ride in threaded bushing bearings, 21 and 22, these bushings being adjustably confined against the end of plug, 2, by locknuts 23 and 24 respectively.

In practical service it is possible to hold the frictionally engaging surfaces of the plug and plug seat in fluid tight working relation over a long period of time without attention other than the occasional forcing down of the lubricant to the plug and plug seat thereby overcoming in an efficient manner the shortcomings of this otherwise valuable and highly desirable form of fitting with its straight port passage for closing or throttling the fluid flow in pipe lines and when after long and continuous service the reasonable wear of the two lubricated metallic surfaces of the plug and plug seat makes it necessary to bring these surfaces into closer relation with each other this is readily accomplished through simple adjusting and locking means which hold the plug and plug seat in fluid tight working contact independent of the pressure passing through the cock or springs as commonly resorted to for holding the plug and plug seat in fluid tight working engagement, and which pressure is the fruitful cause of excessive abrasion and leakage between the plug and plug seat destroying the true value of the plug cock type of pipe line closure.

In the construction of the invention I do not restrict myself to the exact form of locking and rotatably holding the plug in the plug seat against vertical movement therein by the flange or plate attached to the casing, it being within the scope of the invention to provide any adjustable means for holding the plug in the plug seat rotatably confined against vertical movement through a plate or equivalent structure across the end of the plug seat affixed to the casing.

What I claim is:—

1. In a plug cock, a casing with plug seat, a plate affixed to the casing, a plug seated in the casing and rotatably secured to the plate against vertical movement.

2. In a plug cock, a casing with plug seat, a plate affixed to the casing, a plug seated in the casing and rotatably and adjustably secured to the plate against vertical movement.

3. In a plug cock, a casing with plug seat, a plate affixed to the casing, a plug seated in the casing and rotatably secured to the plate against vertical movement and means for lubricating the plug and plug seat surfaces.

4. In a plug cock, a casing with plug seat, a plate affixed to the casing, a plug seated in the casing and rotatably and adjustably secured to the plate against vertical movement and means for lubricating the plug and plug seat surfaces.

5. In a plug cock, a casing with plug seat, a plate affixed to the casing, a plug seated in the casing and rotatably secured to the plate against vertical movement and a lubricant holder attached to the plate communicating lubricant through ports in the plate to the plug and plug seat surfaces.

6. In a plug cock, a casing with plug seat, a plate affixed to the casing, a plug seated in the casing and rotatably and adjustably secured to the plate against vertical movement and a lubricant holder attached to the plate communicating lubricant through ports in the plate to the plug and plug seat surfaces.

JESSE C. MARTIN, Jr.

Witnesses:
W. W. HEALEY,
T. D. GARLICHS.